US012751471B2

(12) United States Patent
Jewell et al.

(10) Patent No.: US 12,751,471 B2
(45) Date of Patent: Oct. 6, 2026

(54) PET FOOD COMPOSITIONS

(71) Applicant: Hill's Pet Nutrition, Inc., Topeka, KS (US)

(72) Inventors: Dennis Jewell, Lawrence, KS (US); Kiran Panickar, Lawrence, KS (US); Laura Morgan, Saint George, KS (US)

(73) Assignee: Hill's Pet Nutrition, Inc., Overland Park, KS (US)

(*) Notice: Subject to any disclaimer, the term of this patent is extended or adjusted under 35 U.S.C. 154(b) by 762 days.

(21) Appl. No.: 17/785,584

(22) PCT Filed: Dec. 16, 2019

(86) PCT No.: PCT/US2019/066618
§ 371 (c)(1),
(2) Date: Jun. 15, 2022

(87) PCT Pub. No.: WO2021/126159
PCT Pub. Date: Jun. 24, 2021

(65) Prior Publication Data

US 2023/0030915 A1 Feb. 2, 2023

(51) Int. Cl.

| | |
|---|---|
| ***A23K 50/40*** | (2016.01) |
| ***A23K 20/105*** | (2016.01) |
| *A23K 10/18* | (2016.01) |
| *A23K 10/30* | (2016.01) |
| *A23K 20/142* | (2016.01) |
| *A23K 20/158* | (2016.01) |
| *A23K 20/163* | (2016.01) |
| *A23K 20/174* | (2016.01) |

(52) U.S. Cl.
CPC ............ *A23K 50/40* (2016.05); *A23K 20/105* (2016.05); *A23K 10/18* (2016.05); *A23K 10/30* (2016.05); *A23K 20/142* (2016.05); *A23K 20/158* (2016.05); *A23K 20/163* (2016.05); *A23K 20/174* (2016.05)

(58) Field of Classification Search
CPC .......... A61K 8/064; A61K 8/27; A23K 50/40; A23K 20/105; A23K 10/18; A23K 10/30; A23K 20/142; A23K 20/158; A23K 20/163; A23K 20/174; A23K 20/179; A23K 20/30; A23K 50/42; A23K 50/48; A23V 2002/00
See application file for complete search history.

(56) References Cited

U.S. PATENT DOCUMENTS

| | | | | |
|---|---|---|---|---|
| 2008/0108548 | A1* | 5/2008 | Luyer .................. | A23L 33/115 514/5.5 |
| 2010/0055182 | A1 | 3/2010 | Gastner et al. | |
| 2011/0183006 | A1 | 7/2011 | Yamka et al. | |
| 2013/0041020 | A1 | 2/2013 | Frantz | |
| 2018/0168197 | A1 | 6/2018 | Middleton et al. | |

FOREIGN PATENT DOCUMENTS

| | | | |
|---|---|---|---|
| CN | 102835569 | A | 12/2012 |
| CN | 109965147 | A | 7/2019 |
| WO | 2000/012071 | A2 | 3/2000 |

OTHER PUBLICATIONS

Machine translation of Shen et al., CN109965147A [online]. Espacenet [retrieved on 129/2025]. Retrieved from the internet: <https://worldwide.espacenet.com/patent/>. (Year: 2019).*
Xu et al., 2011, "Research advances in physiological function and mechanism of action of L-carnitine," with English translation of the relevant parts, Chinese Journal of Animal Nutrition, 2(3):357-363.
Zhang, 2019, "Review of betaine and its application in clinical practice," with English translation of the relevant parts, Smart Healthcare, (5)21:115-116.
Ghyczy et al., 2001, "Electrophilic methyl groups present in the diet ameliorate pathological states induced by reductive and oxidative stress: a hypothesis", British Journal of Nutrition, 85(4):409-414.
International Search Report and the Written Opinion of the International Searching Authority issued in International Application PCT/US2019/066618 mailed Sep. 7, 2020.
Zhiqiang et al., 2003, "New progress in drug treatment of skin diseases," with English translation of the relevant parts, Southeast University Press, Nanjing, 1st ed., Ch. 11, pp. 176-179.

* cited by examiner

*Primary Examiner* — David Browe

(57) ABSTRACT

Described herein are pet food compositions comprising—in relevant part—effective amounts of betaine and carnitine. Methods of making and using these compositions are also described.

15 Claims, No Drawings

PET FOOD COMPOSITIONS

CROSS-REFERENCE TO RELATED APPLICATION

This application is a U.S. National Stage application of International Application No. PCT/US2019/066618, filed Dec. 16, 2019, the contents of which are incorporated herein by reference in its entirety.

BACKGROUND

Methods and compositions for reducing ocular discomfort are disclosed in U.S. Pat. No. 10,085,960. That disclosure relates to compositions and devices which include an osmolytic agent, in particular a betaine or carnitine compound, for reducing ocular discomfort associated with various diseases or conditions, in particular diseases or conditions associated with high tear film tonicity. That disclosure also relates to methods of treating or preventing various diseases or conditions using compositions and devices of the disclosure.

Glycine betaine and its uses as an anti-hemorrhagic agent are disclosed in International Patent Publication No. WO/2002/062322. A pharmaceutical combination comprising a therapeutic effective amount of a therapeutically active agent with at least one hemorrhagic side effect, and a therapeutic effective amount of a compound of formula $(CH_3)_3N^+(CH_2)_nCOO^-$ with n an integer from 1 to 5 for preventing or reducing said hemorrhagic side effect.

Glycine betaine (betaine) acts as a methyl group donor in transmethylation reactions in organisms. Betaine occurs in numerous vertebrate tissues as an osmolyte, ensuring osmoprotection. Betaine is safe for piglets at the maximum supplementation rate of 2 000 mg/kg complete feed with a margin of safety below 5. This conclusion is extended to all pigs and extrapolated to all animal species and categories. The use of betaine as a feed additive up to a supplementation of 2 000 mg/kg complete feed is unlikely to pose concerns for consumer safety. In the absence of data, betaine anhydrous should be considered hazardous by inhalation, irritant to skin, eyes and mucous membranes and a skin sensitiser. The supplementation of feed with betaine anhydrous does not pose a risk to the environment. Betaine has the potential to become efficacious in all animal species and categories when administered via feed or water for drinking. The FEEDAP Panel made some recommendations on (i) introduction of a maximum content for supplemental betaine in complete feed and water for drinking; (ii) avoidance of simultaneous use of betaine in feed and water for drinking; and (iii) avoidance of simultaneous inclusion of betaine and choline chloride in premixtures.

Although many advances in the art of formulating pet food composition have been made with respect to improving its ability to treat diseases, many more challenges remain.

BRIEF SUMMARY

The present invention is directed to a new approach to improving immune response in companion animals, wherein the addition of betaine and carnitine reduced basal inflammation, which is a desirable effect in animals with inflammation, and yet enhances acute inflammation, which is a desirable effect in animals fighting an infection. This immune response improvement is achieved by feeding the animal with a dietary composition comprising elevated amounts of betaine and carnitine.

The present invention is also directed to a dietary composition for a companion animal comprising elevated amounts of glycine betaine and elevated amounts of carnitine. Under one embodiment, the present invention is directed to a dietary composition for a companion animal comprising about 700 ppm to about 10,000 ppm of added glycine betaine; and about 50 ppm to about 1000 ppm of added carnitine.

Glycine betaine, or simply, betaine, is trimethylglycine or an adduct thereof. Glycine betaine is an N-trimethylated amino acid, wherein the quaternary ammonium exists as the zwitterion at neutral pH. Glycine betaine has the formula $(CH_3)_3N^+—CH_2COO^-$.

Glycine betaine also includes an adduct of the compound glycine betaine, such as a hydrate, acid, or a salt thereof. Examples of hydrates include monohydrate, dihydrate, trihydrate, and like.

Carnitine is β-hydroxy-γ-N-trimethylaminobutyric acid, or 3-hydroxy-4-N,N,N-trimethylaminobutyrate, and has the formula $Me_3N^+—CH_2—CHOH—CH_2—COO^-$. Carnitine is a quaternary ammonium compound involved in metabolism in most mammals, plants, and some bacteria. Under one embodiment, carnitine as used in the present invention is the L-enantiomer.

Acetyl-L-carnitine is an acylated form of L-carnitine, and has the formula $Me_3N^+—CH_2—C^*H(O—C(=O)\text{-}Me)—CH_2—COO^-$. Propionyl-L-carnitine, under certain embodiments, is equivalent to one or more of the following: 3-propanoyloxy-4-(trimethylazaniumyl) butanoate, 3-(1oxo-propoxy)-4-trimethyl ammonium chloride) butanoic acid, glycine propionyl-L-carnitine, L-carnitine propionyl, LPC, PLC, GPLC and propionylcarnitine.

Carnitine is present in the dietary composition of the present invention at levels between about 50 ppm and about 1000 ppm of added carnitine.

Some embodiments of the present invention are directed to a dietary composition for a companion animal comprising added glycine betaine and added carnitine, wherein the ratio of the added glycine betaine to carnitine is between about 25:1 to about 5:1. This ratio is a mass ratio, meaning, that there is about 5 to 25 times more mass of glycine betaine as there is of carnitine.

Either glycine betaine, or carnitine, or both ingredients are frequently present in small amounts in many pet foods nutritionally complete pet food. Depending on the source, these small amounts (i.e., background amounts) of either of these two ingredients may be several tens or hundreds of ppm.

The term "added" in the phrases "added glycine betaine" and "added carnitine" means that these ingredients were specifically added during the preparation, or after the preparation, of the dietary composition of the present invention.

A dietary composition for a companion animal means any type of food that is offered, and is consumed by the companion animal. The dietary composition may be a complete diet that is offered to and is consumed by the companion animal as the exclusive, or nearly exclusive, food intake of the animal.

The present invention is also directed to a dietary composition for a companion animal comprising about 700 ppm to about 10,000 ppm of added glycine betaine, about 50 ppm to about 1000 ppm of added carnitine, and a base dietary composition. Under one embodiment, the base diet composition is a diet composition that is complete. The present invention is directed to a nutritionally complete pet food comprising the diet composition comprising betaine and carnitine.

The nutritionally complete diet contain additional ingredients such as vitamins, minerals, fillers, palatability enhancers, binding agents, flavors, stabilizers, emulsifiers, sweeteners, colorants, buffers, salts, coatings, and the like known to skilled artisans.

The pet food may be a wet pet food. The pet food may be prepared in a canned or wet form using conventional food preparation processes known to skilled artisans. Alternatively, the pet food is a dry pet food. The pet food compositions may be prepared in a dry form using conventional processes known to skilled artisans.

The companion animal is generally a canine or a dog. The dietary composition of the present invention is particularly suitable for treating senior dogs, or small and miniature dogs.

Further, the present invention is also directed to a method of improving immune response in a companion animal comprising administering to the companion animal a pet food comprising an effective amount of the dietary composition. Under one embodiment, the dietary composition is nutritionally complete dog food.

This method improves the immune response in companion animals, by administering food which comprises added betaine and carnitine. The use of elevated amounts of betaine and carnitine has been shown to reduce basal inflammation, yet enhances acute inflammation. Reduction of basal inflammation is a desirable effect in animals with inflammation. Enhancement of acute inflammation is also a desirable effect in companion animals that are fighting an infection.

The treatment of the diet with both added carnitine and betaine has been shown below to maximize this immune response. This response by the use of a combination of betaine and carnitine is greater than the response of that of a diet without either a betaine or carnitine, or with betaine only, or with carnitine only, or as would be predicted as the sum of the uses of betaine only and carnitine only. There appears to be a yet unexplained synergistic effect of the use of betaine and carnitine in dog's diet, than would be predicted from the data on betaine alone and carnitine alone.

DETAILED DESCRIPTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation.

Unless defined otherwise, all technical and scientific terms used herein have the same meanings as commonly understood by one of ordinary skill in the art to which this invention belongs.

All patents, patent applications, publications, and other references cited or referred to herein are incorporated by reference in their entireties for any purpose. In the event of a conflict in a definition in the present disclosure and that of a cited reference, the present disclosure controls.

As used herein and in the appended claims, the singular forms "a", "an", and "the" include plural references unless the context dictates otherwise. The singular form of any class of the ingredients refers not only to one chemical species within that class but also to a mixture of those chemical species. The terms "a" (or "an"), "one or more" and "at least one" may be used interchangeably herein. The terms "comprising", "including", and "having" may be used interchangeably. The term "include" should be interpreted as "include, but are not limited to". The term "including" should be interpreted as "including, but are not limited to".

The abbreviations and symbols as used herein, unless indicated otherwise, take their ordinary meaning. The abbreviations or symbols "ln" means the natural logarithm or a logarithm to the base of mathematical constant e; and "pH" is the negative of the base 10 logarithm of the activity of the hydrogen ion.

Symbols in chemical formulas take their ordinary meaning. Under one embodiment, symbols C, H, Br, Cl, F, N, O, mean carbon, hydrogen, bromine, chlorine, fluorine, nitrogen, and oxygen, respectively. Symbols "—", "═" mean a single covalent bond, and a double covalent bond, respectively. The symbol "Me" means methyl or $—CH_3$. A star within a chemical formula, such as C*, indicates that the atom is a chiral center. Superscripts "+" and "−" indicates a local charge. Small capital letters "L" and "D" prefixes indicate chiral organic compounds and are based on the compound's absolute configuration relative to (+)-glyceraldehyde.

The abbreviation "ppm" means parts per million by weight. The symbol "°" refers to a degree, including a degree of Celsius.

The term "about" when referring to a number means any number within a range of 10% of the number. For example, the phrase "about 700" refers to any number between and including 630.00 and 770.00.

As used throughout, ranges are used as shorthand for describing each and every value that is within the range. Any value within the range can be selected as the terminus of the range.

The phrase "a companion animal" refers to a domesticated or domestic-bred animal whose physical, emotional, behavioral and social needs can be readily met as companions in a home, or in close daily relationship with one or more humans. Under one embodiment, species included in the definition of a companion animal include dogs, canines, cats, felines, horses, rabbits, ferrets, guinea pigs, and select other small mammals. Under another embodiment, species included in the definition of a companion animal include dogs, cats, horses, rabbits, ferrets, guinea pigs and select other small mammals, birds, small reptiles, fish, and domestic-bred farm animals.

The definition of the term "dog" includes a companion dog, a guard dog, a hunting dogs, a herding dog, and a working dog.

The phrase "adult pet" as used herein refers to a subset of "pet" and includes, for example, domesticated dogs (canines) and cats (felines) that are between about 3 years old and about 8 years old.

The phrase "senior pet" as used herein refers to a subset of "pet" and includes, for example, domesticated dogs (canines) and cats (felines) that are about 9 years old and above.

The phrase "dietary composition" refers to food for consumption by a companion animal, or to food for consumption by a dog. This phrase is to be interpreted broadly; the phrase includes food that is consumed by the companion animal or by the cat on exclusive basis, food that is consumed by the companion animal or by the dog on regular basis, food by the companion animal or by the dog consumer on occasional basis, and food by the companion animal or by the dog consumer on rare basis.

Any member in a list of species that are used to exemplify or define a genus may be mutually different from, or overlapping with, or a subset of, or equivalent to, or nearly the same as, or identical to, any other member of the list of species. Further, unless explicitly stated, such as when reciting a Markush group, the list of species that define or exemplify the genus is open, and it is given that other species may exist that define or exemplify the genus just as well as, or better than, any other species listed.

The present invention is directed to a new approach to improving immune response in companion animals, wherein the addition of betaine and carnitine reduced basal inflammation, which is a desirable effect in animals with inflammation, and yet enhances acute inflammation, which is a desirable effect in animals fighting an infection. This immune response improvement is achieved by feeding the animal with a dietary composition comprising elevated amounts of betaine and carnitine.

The present invention is also directed to a dietary composition for a companion animal comprising elevated amounts of glycine betaine and elevated amounts of carnitine. Under one embodiment, the present invention is directed to a dietary composition for a companion animal comprising about 700 ppm to about 10,000 ppm of added glycine betaine; and about 50 ppm to about 1000 ppm of added carnitine.

Glycine betaine, or simply, betaine, is trimethylglycine or an adduct thereof. Glycine betaine is also known as trimethyl glycine, 2-trimethylammonioacetate, or N,N,N-trimethylglycine, and is abbreviated as TGM. Glycine betaine is a derivative of the amino acid glycine. Glycine betaine is an N-trimethylated amino acid, wherein the quaternary ammonium exists as the zwitterion at neutral pH. Glycine betaine has the formula $(CH_3)_3N^+—CH_2—COO^-$.

Under one embodiment, the definition of glycine betaine also includes an adduct of the compound glycine betaine, such as a hydrate, acid, or a salt thereof. Examples of hydrates include monohydrate, dihydrate, trihydrate, and like. Under some embodiments, the molecular ratio of water molecules to the glycine betaine is a non-integer. Acid adducts of glycine betaine include hydrogen halides, such as hydrogen fluoride, HF, hydrogen chloride, HCl, hydrogen bromide, HBr, hydrogen iodide, HI, and mixtures thereof.

Glycine betaine is a methyl group donor that functions in the normal metabolic cycle of methionine and reduces homocystinuria in patients with inborn errors of methionine metabolism. It has been approved for human and animal use in several jurisdiction. Glycine betaine does not lower tHcy levels or prevent clinical symptoms.

For canines, glycine betaine has been used to help digest food by breaking up fats and proteins. It has been hypothesized, that betaine activates pepsinogen to pepsin conversion, stimulates flow of bile and pancreative enzymes, facilitates nutrient absorption, and helps prevents bacterial and fungal over growth.

Glycine betaine can be easily prepared by mixing glycine with methyl iodide. Glycine betaine may also be generated as a byproduct during the processing of sucrose from sugar beets.

Glycine betaine may be obtained from commercial sources, including DuPont Nutrition & Biosciences (Marlborough, Wiltshire, UK), Associated British Foods PLC (London, UK), American Crystal Sugar (Moorhead, Minnesota, USA), Sunwin Biotech Shangdong Co. Ltd. (Weifang, Shandong, China), Stepan Co. (Northfield, Illinois, USA), and Amino GmbH (Frellstedt, Niedersachsen, Germany), and like.

The present invention is directed to a dietary composition for a companion animal comprising about 700 ppm to about 10,000 ppm of added glycine betaine, and about 50 ppm to about 1,000 ppm of added carnitine.

The dietary composition of the present invention comprises between about 700 ppm and about 10,000 ppm of added glycine betaine. Under one embodiment, the dietary composition comprises between about 700 ppm and about 7,000 ppm of added glycine betaine. Under one embodiment, the dietary composition comprises between about 700 ppm and about 5,000 ppm of added glycine betaine. Under one embodiment, the dietary composition comprises between about 700 ppm and about 3,000 ppm of added glycine betaine. Under one embodiment, the dietary composition comprises between about 700 ppm and about 1,500 ppm of added glycine betaine. Under one embodiment, the dietary composition comprises between about 700 ppm and about 1,000 ppm of added glycine betaine.

Under one embodiment, the dietary composition comprises between about 1,000 ppm and about 10,000 ppm of added glycine betaine. Under one embodiment, the dietary composition comprises between about 1,000 ppm and about 7,000 ppm of added glycine betaine. Under one embodiment, the dietary composition comprises between about 1,000 ppm and about 5,000 ppm of added glycine betaine. Under one embodiment, the dietary composition comprises between about 1,000 ppm and about 3,000 ppm of added glycine betaine. Under one embodiment, the dietary composition comprises between about 1,000 ppm and about 1,500 ppm of added glycine betaine.

Under one embodiment, the dietary composition comprises between about 1,500 ppm and about 10,000 ppm of added glycine betaine. Under one embodiment, the dietary composition comprises between about 1,500 ppm and about 7,000 ppm of added glycine betaine. Under one embodiment, the dietary composition comprises between about 1,500 ppm and about 5,000 ppm of added glycine betaine. Under one embodiment, the dietary composition comprises between about 1,500 ppm and about 3,000 ppm of added glycine betaine.

Under one embodiment, the dietary composition comprises between about 3,000 ppm and about 10,000 ppm of added glycine betaine. Under one embodiment, the dietary composition comprises between about 3,000 ppm and about 7,000 ppm of added glycine betaine. Under one embodiment, the dietary composition comprises between about 3,000 ppm and about 5,000 ppm of added glycine betaine. Under one embodiment, the dietary composition comprises between about 5,000 ppm and about 10,000 ppm of added glycine betaine. Under one embodiment, the dietary composition comprises between about 5,000 ppm and about 7,000 ppm of added glycine betaine. Under one embodiment, the dietary composition comprises between about 7,000 ppm and about 10,000 ppm of added glycine betaine.

The present invention is directed to a dietary composition for a companion animal that comprises glycine betaine in any of the above mass ranges, and also further comprises about 50 ppm to about 1,000 ppm of added carnitine.

Under one embodiment, carnitine is β-hydroxy-γ-N-trimethylaminobutyric acid, or 3-hydroxy-4-N,N,N-trimethylaminobutyrate, and has the formula $Me_3N^+—CH_2—CHOH—CH_2—COO^-$. Carnitine is a quaternary ammonium compound involved in metabolism in most mammals, plants, and some bacteria. Carnitine is derived from an amino acid and is found in various concentrations nearly all organisms and animal tissue.

Under one embodiment, carnitine exists in two isomers, D-carnitine and L-carnitine, which are both biologically active. However, L-Carnitine is the preferred isomer with the beneficial activity; and D-carnitine may have certain toxicities associated with its use. At room temperature, pure carnitine is a white powder, and a water-soluble zwitterion with low toxicity. Under one embodiment, carnitine as used in the present invention is the L-enantiomer.

Under one embodiment, carnitine includes carnitine wherein the hydroxide group has been esterified. Examples include acetyl-L-carnitine and propionyl-L-carnitine.

Acetyl-L-carnitine is an acylated form of L-carnitine, and has the formula $Me_3N^+$—$CH_2$—C*H(O—C(=O)-Me)—$CH_2$—$COO^-$. Dietary acetylcarnitine is broken down in the blood by plasma esterases to carnitine which is used by the body to transport fatty acids into the mitochondria for breakdown. In humans and non-human animals, acetyl-L-carnitine is used for treatment of a variety of mental disorders including Alzheimer's disease, age-related memory loss, late-life depression, thinking problems related to alcoholism, thinking problems related to Lyme disease, thinking problems related to very poor liver function, hepatic encephalopathy, aging skin, withdrawal from alcohol, Down syndrome, bipolar disorder, poor circulation in the brain after a stroke, cataracts, nerve pain due to diabetes, nerve pain due to drugs used in the treatment of AIDS or cancer, nerve pain caused by sciatica, fibromyalgia, facial paralysis, tiredness related to getting older, tiredness related to multiple sclerosis, amyotrophic lateral sclerosis, high levels of activity in children with the genetic condition fragile-X syndrome, and attention deficit-hyperactivity disorder (ADHD).

Propionyl-L-carnitine, under certain embodiments is equivalent to one or more of the following: 3-propanoyloxy-4-(trimethylazaniumyl) butanoate, 3-(1-oxopropoxy)-4-trimethyl ammonium chloride) butanoic acid, glycine propionyl-L-carnitine, L-carnitine propionyl, LPC, PLC, GPLC and propionylcarnitine.

In humans or animals, propionyl-L-carnitine is used for treating leg pain (intermittent claudication) due to poor blood circulation (peripheral vascular disease, PVD). PVD is often caused by diabetes or "hardening of the arteries" (atherosclerosis). Propionyl-L-carnitine is also used to treat congestive heart failure (CHF), chest pain (angina), and some bowel problems such as ulcerative colitis.

Carnitine is present in the dietary composition of the present invention at levels between about 50 ppm and about 1000 ppm of added carnitine.

Under one embodiment, the dietary composition comprises between about 50 ppm and about 1,000 ppm of added carnitine. Under one embodiment, the dietary composition comprises between about 50 ppm and about 700 ppm of added carnitine. Under one embodiment, the dietary composition comprises between about 50 ppm and about 500 ppm of added carnitine. Under one embodiment, the dietary composition comprises between about 50 ppm and about 300 ppm of added carnitine. Under one embodiment, the dietary composition comprises between about 50 ppm and about 100 ppm of added carnitine.

Under one embodiment, the dietary composition comprises between about 100 ppm and about 1,000 ppm of added carnitine. Under one embodiment, the dietary composition comprises between about 100 ppm and about 700 ppm of added carnitine. Under one embodiment, the dietary composition comprises between about 100 ppm and about 1000 ppm of added carnitine. Under one embodiment, the dietary composition comprises between about 100 ppm and about 300 ppm of added carnitine.

Under one embodiment, the dietary composition comprises between about 300 ppm and about 1,000 ppm of added carnitine. Under one embodiment, the dietary composition comprises between about 300 ppm and about 700 ppm of added carnitine. Under one embodiment, the dietary composition comprises between about 300 ppm and about 3000 ppm of added carnitine. Under one embodiment, the dietary composition comprises between about 500 ppm and about 1,000 ppm of added carnitine. Under one embodiment, the dietary composition comprises between about 500 ppm and about 700 ppm of added carnitine. Under one embodiment, the dietary composition comprises between about 700 ppm and about 1,000 ppm of added carnitine.

Under one embodiment, the present invention is directed to a dietary composition for a companion animal comprising added glycine betaine and added carnitine, wherein the ratio of the added glycine betaine to carnitine is between about 25:1 to about 5:1. This ratio is a mass ratio, meaning, that there is about 5 to 25 times more mass of glycine betaine as there is of carnitine.

Under one embodiment, the dietary composition comprises added glycine betaine and added carnitine, wherein the ratio of the added glycine betaine to carnitine is between about 25:1 to about 5:1. Under one embodiment, the dietary composition comprises added glycine betaine and added carnitine, wherein the ratio of the added glycine betaine to carnitine is between about 25:1 to about 8:1. Under one embodiment, the dietary composition comprises added glycine betaine and added carnitine, wherein the ratio of the added glycine betaine to carnitine is between about 25:1 to about 12:1. Under one embodiment, the dietary composition comprises added glycine betaine and added carnitine, wherein the ratio of the added glycine betaine to carnitine is between about 25:1 to about 12:1.

Under one embodiment, the dietary composition comprises added glycine betaine and added carnitine, wherein the ratio of the added glycine betaine to carnitine is between about 18:1 to about 5:1. Under one embodiment, the dietary composition comprises added glycine betaine and added carnitine, wherein the ratio of the added glycine betaine to carnitine is between about 18:1 to about 8:1. Under one embodiment, the dietary composition comprises added glycine betaine and added carnitine, wherein the ratio of the added glycine betaine to carnitine is between about 1:1 to about 1:1.

Under one embodiment, the dietary composition comprises added glycine betaine and added carnitine, wherein the ratio of the added glycine betaine to carnitine is between about 12:1 to about 5:1. Under one embodiment, the dietary composition comprises added glycine betaine and added carnitine, wherein the ratio of the added glycine betaine to carnitine is between about 12:1 to about 8:1. Under one embodiment, the dietary composition comprises added glycine betaine and added carnitine, wherein the ratio of the added glycine betaine to carnitine is between about 8:1 to about 5:1.

Either glycine betaine, or carnitine, or both ingredients are frequently present in small amounts in many pet foods nutritionally complete pet food. Depending on the source, these small amounts (i.e., background amounts) of either of these two ingredients may be several tens or hundreds of ppm.

The term "added" in the phrases "added glycine betaine" and "added carnitine" means that these ingredients were specifically added during the preparation, or after the preparation, of the dietary composition of the present invention. This means that under certain embodiments, the measurable level of the glycine betaine or carnitine may be greater than the amount of such ingredients added.

Under one embodiment, the amount of background amount of the glycine betaine is negligible with respect to the amount of added glycine betaine. Under one embodiment, the amount of background amount of the glycine betaine is statistically significant with respect to the amount of added glycine betaine. Under one embodiment, the amount of background amount of the carnitine is negligible with respect to the amount of added carnitine. Under one embodiment, the amount of background amount of the carnitine is statistically significant with respect to the amount of added carnitine.

Under one embodiment, both the background amount of carnitine and the background amount of glycine betaine are negligible with respect to the amounts of added carnitine and added glycine betaine, respectively. Under one embodiment, both the background amount of carnitine and the background amount of glycine betaine are statistically significant with respect to the amounts of added carnitine and added glycine betaine, respectively.

A dietary composition for a companion animal, under one embodiment, means any type of food that is offered, and is consumed by the companion animal. Under one embodiment, the dietary composition is a complete diet that is offered to and is consumed by the companion animal as the exclusive, or nearly exclusive, food intake of the animal.

Under one embodiment, the dietary composition is a diet that is offered to and is consumed by the companion animal comprises the majority of the food intake of the animal. Such a diet may be used once or several times per day.

Under one embodiment, the dietary composition is a diet that is offered to and is consumed by the companion animal comprises a minor part of the food intake of the animal. Such a diet may be used only occasionally, such as, several times per week or per month.

Further, the present invention is also directed to a dietary composition for a companion animal comprising about 700 ppm to about 10,000 ppm of added glycine betaine, about 50 ppm to about 1000 ppm of added carnitine, and a base dietary composition. Under one embodiment, the base diet composition is a diet composition that is complete. Such a composition may be the offered and consumed on exclusive, or nearly, exclusive, basis. Under one embodiment, the base diet composition contains only some of the ingredients that are necessary for a complete diet. Such a diet composition is suitable to be administered to the companion animal on an occasional basis.

The dietary composition for the companion animal may comprise added glycine betaine, added carnitine, and a base dietary composition comprising ingredients, such as crude protein, carbohydrate, dietary fiber consisting of insoluble fiber and soluble fiber, crude fats, crude fiber, ash, moisture, and like.

The pet food composition may contain additives known in the art. Such additives should be present in amounts that do not impair the purpose and effect provided by the invention. Examples of additives include substances with a stabilizing effect, organoleptic substances, processing aids, and substances that provide nutritional benefits.

Stabilizing substances may increase the shelf life of the composition. Suitable examples can include preservatives, antioxidants, synergists and sequestrants, packaging gases, stabilizers, emulsifiers, thickeners, gelling agents, and humectants. Examples of emulsifiers and/or thickening agents include gelatin, cellulose ethers, starch, starch esters, starch ethers, and modified starches.

Additives for coloring, palatability, and nutritional purposes can include colorants, salts (including but not limited to sodium chloride, potassium citrate, potassium chloride, and other edible salts), vitamins, minerals, and flavoring. The amount of such additives in a composition typically is up to about 5% by weight (on a dry matter basis of the composition). Other additives can include antioxidants, omega-3 fatty acids, omega-6 fatty acids, glucosamine, chondroitin sulfate, vegetable extracts, herbal extracts, etc.

In certain embodiments, the pet food composition comprises vitamins and minerals in amounts required to avoid deficiency and maintain health. These amounts are readily available in the art. The Association of American Feed Control Officials (AAFCO) provides recommended amounts of such nutrients for dogs and cats (see Association of American Feed Control Officials. Official Publication, pp. 126-140 (2003)).

Vitamins could as an example include vitamin A, vitamin B1 (thiamine or related sources such as thiamine mononitrate), vitamin B2 (riboflavin), vitamin B3 (niacin), vitamin B5 (pantothenic acid or related sources such as calcium pantothenate), vitamin B6 (pyridoxine or related sources such as pyridoxine hydrochloride), vitamin B8 (folic acid), vitamin B12, vitamin C (ascorbic acid), vitamin D (such as a vitamin D3 supplements), vitamin E, vitamin H (biotin), vitamin K, acetate, choline and choline related sources such as choline chloride, and inositol.

Minerals and trace elements could as an example include calcium, phosphorus, sodium, potassium, magnesium, copper, zinc, choline, and iron salts. Mineral sources can include, for example, sodium selenite, monosodium phosphate, calcium carbonate, potassium chloride, ferrous sulfate, zinc oxide, manganese sulfate, copper sulfate, manganous oxide, potassium iodide, and/or cobalt carbonate.

The term "carbohydrate" as used herein includes polysaccharides (e.g., starches and dextrins) and sugars (e.g., sucrose, lactose, maltose, glucose, and fructose) that are metabolized for energy when hydrolyzed. Examples of carbohydrates suitable for inclusion in the compositions disclosed herein include but are not limited to, corn, grain sorghum, wheat, barley, and rice.

In certain embodiments, the carbohydrate component comprises a mixture of one or more carbohydrate sources. Examples of carbohydrate or carbohydrate ingredients may comprise cereals, grains, corn, wheat, rice, oats, corn grits, sorghum, grain sorghum/milo, wheat bran, oat bran, amaranth, Durum, and/or semolina.

One skilled in the art could manipulate the texture of the final product by properly balancing carbohydrate sources. For example, short chain polysaccharides lend to be sticky and gluey, and longer chain polysaccharides are less sticky and gluey than the shorter chain; the desired texture of this hybrid food is achieved by longer chain polysaccharide and modified starches such as native or modified starches, cellulose and the like.

The carbohydrate mixture may additionally comprise optional components such as added salt, spices, seasonings, vitamins, minerals, flavorants, colorants, and the like. The amount of the optional additives is at least partially dependent on the nutritional requirements for different life stages of animals.

In some embodiments, the present invention may comprise about 10% wt. to about 14% wt. of fat. Sources of fats or fat ingredients, may comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

In some embodiments, the present invention may comprise about 15% wt. to about 20% wt. of protein. The term "protein" means a polypeptide, or a peptide, or a polymer of amino acids. The term encompasses naturally occurring and non-naturally occurring (synthetic) polymers and polymers in which artificial chemical mimetics are substituted for one or more amino acids. The term also encompasses fragments, variants, and homologs that have the same or substantially the same properties and perform the same or substantially the same function as the original sequence. The term encompasses polymers of any length, including polymers containing from about 2 to 1000, from 4 to 800, from 6 to 600, and from 8 to 400 amino acids. The term includes amino acid polymers that are synthesized and that are isolated and purified from natural sources. Under some embodiments, the terms "polypeptide", "peptide" or "protein" are used interchangeably.

Protein may be supplied by any of a variety of sources known by those of ordinary skill in the art including plant sources, animal sources, or both. For example, animal sources may include meat, meat-by products, seafood, dairy, eggs, etc. Meats, for example, may include animal flesh such as poultry fish, and mammals including cattle, pigs, sheep, goats, and the like. Meat by-products may include any secondary product from a primary food processing line. It may also include some ingredients that are typically not used in human consumption, for example, lungs, kidneys, brain, livers, stomachs and intestines. Plant protein includes, for example, soybean, cottonseed, and peanuts.

Examples of protein or protein ingredients may comprise chicken meals, chicken, chicken by-product meals, lamb, lamb meals, turkey, turkey meals, beef, beef by-products, viscera, fish meal, enterals, kangaroo, white fish, venison, soybean meal, soy protein isolate, soy protein concentrate, corn gluten meal, corn protein concentrate, distillers dried grains, and/or distillers dried grain solubles and single-cell proteins, for example yeast, algae, and/or bacteria cultures.

The protein can be intact, completely hydrolyzed, or partially hydrolyzed. The protein content of foods may be determined by any number of methods known by those of skill in the art, for example, as published by the Association of Official Analytical Chemists in Official Methods of Analysis ("OMA"), method 988.05. The amount of protein in a composition disclosed herein may be determined based on the amount of nitrogen in the composition according to methods familiar to one of skill in the art.

Examples of amino acids may comprise 1-Tryptophan, Taurine, Histidine, Carnosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Taurine, Tyrosine, Homocysteine, Ornithine, Citruline, Glutamic acid, Proline, and/or Serine. Sources of carotenoids may comprise lutein, astaxanthin, zeaxanthin, bixin, lycopene, and/or beta-carotene. Sources of antioxidant ingredients may comprise tocopherols (vitamin E), vitamin C, vitamin A, plant-derived materials, carotenoids (described above), selenium, and/or CoQ10 (Co-enzyme Q10).

Examples of fatty acid ingredients may comprise arachidonic acid, alph-alinolenic acid, gamma linolenic acid, linoleic acid, eicosapentanoic acid (EPA), docosahexanoic acid (DHA), and/or fish oils as a source of EPA and/or DHA. Sources of glucose mimetics may comprise glucose anti-metabolites including 2-deoxy Dglucose, 5-thio-D-glucose, 3-O-methylglucose, anhydrosugars including 1,5-anhydro-D-glucitol, 2,5-anhydro-D-glucitol, and 2,5-anhydro-D-mannitol, mannoheptulose, and/or avocado extract comprising mannoheptulose.

Still other ingredients may include beef broth, brewers dried yeast, egg, egg product, flax meal, DL methionine, amino acids, leucine, lysine, arginine, cysteine, cystine, aspartic acid, polyphosphates, sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, Lcarnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), antifoaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solubilizing agents, suspending agents (non-surfactant), solvents, viscosity increasing agents (aqueous and non-aqueous), sequestrants, and/or keratolytics.

The probiotic component may comprise any suitable bacteria, yeast, microorganisms, and/or mixtures of any thereof. Various probiotic microorganisms are known in the art. In certain embodiments, the probiotic component may comprise bacteria of the order Lactobacillales; bacteria of the genus *Bacillus, Bacteroides*, and/or *Bifidobacterium*; yeast of the order *Saccharomycetales* including the genus *Saccharomyces* and *Candida*; and/or mixtures of any thereof. The probiotic may or may not form a spore.

Non-limiting examples of bacteria of the order Lactobacillales suitable for use herein include the genus *Streptococci* such as *Streptococcus lactis, Streptococcus cremoris, Streptococcus diacetylactis*, and/or *Streptococcus thermophilus*; the genus *Enterococcus* such as *Enterococcus faecium*, the family Lactobacillillaceae including the genus *Pediococcus* (i.e. *Pediococcus cerevisiae*), the genus *Leuconostroc*, and the genus *Lactobacilli* such as *Lactobacillus bulgaricus, Lactobacillus acidophilus, Lactobacillus helveticus, Lactobacillus bifidus, Lactobacillus casei, Lactobacillus lactis, Lactobacillus plantarum, Lactobacillus rhamnosus, Lactobacillus delbrukii, Lactobacillus thermophilus, Lactobacillus fermentii, Lactobacillus salvarius, Lactobacillus reuteri*, and/or mixtures of any thereof. Nonlimiting examples of bacteria of the genus *Bifidobacteria* include *Bifidobacterium longum, Bifidobacterium infantis, Bifidobacterium bifidum, Bifidobacterium animalis*, and/or *Bifidobacterium pseudolongum*; and/or mixtures of any thereof.

In certain embodiments, the pet food composition may include polyphenols. In some embodiments, the polyphenol source comprises a phenolic compound selected from ellagic acid; gallic acid; protocatechuic acid; p-hydroxybenzoic acid; catechin; and a combination of two or more thereof. In some embodiments, the polyphenol source comprises pecan shells, or any other component of the pecan nut. In some embodiments, the pecan shell may also be a source of lignin-based fiber. Examples of further sources of polyphenols may comprise tea extract, rosemary extract, rosemarinic acid, coffee extract, pecan shells, caffeic acid, turmeric extract, blueberry extract, grape extract, grapeseed extract, and/or soy extract.

Crude fat or fat can be supplied by any of a variety of sources known by those skilled in the art, including meat, meat by-products, fish oil, and plants. Plant fat sources include wheat, flaxseed, rye, barley, rice, sorghum, corn, oats, millet, wheat germ, corn germ, soybeans, peanuts, and cottonseed, as well as oils derived from these and other plant fat sources. The fat content of a composition may be determined by any number of methods known by those of skill in the art.

Ash consists of compounds that are not organic or water, generally produced by the combustion of biological materials. Ash may be determined by any number of methods known by those of skill in the art.

Moisture is the amount of water in the dietary composition. Dry kibble tends to have a moisture content of between 6 and 10 percent, semi-moist foods between 15 and 30 percent, and wet foods around 75 percent.

Under one embodiment, the present invention is directed to a nutritionally complete pet food comprising the diet composition comprising betaine and carnitine. Under one embodiment, the nutritionally complete pet food consists of, or consists essentially of, the diet composition. In such a case, the dietary composition is a nutritionally complete pet food.

Under one embodiment, the nutritionally complete pet food comprises between about 60 wt % and about 100 wt % of the diet composition. Under one embodiment, the nutritionally complete pet food comprises between about 30 wt % and about 90 wt % of the diet composition.

The nutritionally complete diet contains additional ingredients such as vitamins, minerals, fillers, palatability enhancers, binding agents, flavors, stabilizers, emulsifiers, sweeteners, colorants, buffers, salts, coatings, and the like known to skilled artisans. Stabilizers include substances that tend to increase the shelf life of the composition such as preservatives, synergists and sequestrants, packaging gases, stabilizers, emulsifiers, thickeners, gelling agents, and humectants. Examples of emulsifiers and/or thickening agents include gelatin, cellulose ethers, starch, starch esters, starch ethers, and modified starches. Specific amounts for each composition component, food ingredient, and other ingredients will depend on a variety of factors such as the particular components and ingredients included in the composition; the species of patient; the patient's age, body weight, general health, sex, and diet; the animal's consumption rate; the type of disease being treated; and the like. Therefore, the component and ingredient amounts may vary widely and may deviate from the preferred proportions described herein.

Under one embodiment, the pet food is wet pet food. The pet food may be prepared in a canned or wet form using conventional food preparation processes known to skilled artisans. Typically, ground animal proteinaceous tissues are mixed with the other ingredients such as fish oils, cereal grains, balancing ingredients, special purpose additives (e.g., vitamin and mineral mixtures, inorganic salts, cellulose and beet pulp, bulking agents, and the like) and water in amounts sufficient for processing. These ingredients are mixed in a vessel suitable for heating while blending the components. The heating of the mixture is effected using any suitable manner, e.g., direct steam injection or using a vessel fitted with a heat exchanger. Following the addition of the last ingredient, the mixture is heated to a temperature of from about 10° C. to about 100° C. Temperatures outside this range are acceptable but may be commercially impractical without the use of other processing aids. When heated to the appropriate temperature, the material will typically be in the form of a thick liquid. The thick liquid is filled into cans. A lid is applied, and the container is hermetically sealed. The sealed can is then placed into conventional equipment designed to sterilize the contents. Sterilization is usually accomplished by heating to temperatures of greater than about 110° C. for an appropriate time depending on the temperature used, the composition, and similar factors. The compositions of the present invention can be added to the food compositions before, during, or after preparation.

Under one embodiment, the pet food is dry pet food. The pet food compositions may be prepared in a dry form using conventional processes known to skilled artisans. Typically, dry ingredients such as animal protein, plant protein, grains, and the like are ground and mixed together. Moist or liquid ingredients, including fats, oils, animal protein, water, and the like, are then added to and mixed with the dry mix. The mixture is then processed into dry food pieces.

The food compositions can be in any form useful for feeding the composition to a patient, e.g., kibbles, treats, and toys for animal food. Kibbles are generally formed using an extrusion process in which the mixture of dry and wet ingredients is subjected to mechanical work at a high pressure and temperature and forced through small openings and cut off into kibble by a rotating knife. The wet kibble is then dried and optionally coated with one or more topical coatings such as flavors, fats, oils, powders, and the like. Kibble also can be made from the dough using a baking process, rather than extrusion, wherein the dough is placed into a mold before dry-heat processing. Treats include compositions that are given to an animal to entice the animal to eat during a non-meal time, e.g., dog bones or biscuits for canines. Treats may be nutritional wherein the composition comprises one or more nutrients or and may have a food-like composition. Non-nutritional treats encompass any other treats that are non-toxic. The composition or components are coated onto the treat, incorporated into the treat, or both. Treats of the present invention can be prepared by an extrusion or baking process similar to those used for dry food. Other processes also may be used to either coat the composition on the exterior of existing treat forms or inject the composition into an existing treat form. Toys include chewable toys such as artificial bones and food compositions shaped to resemble natural foods that are appealing to the animal. The food composition of the present invention can comprise the toy or can form a coating on the surface of the toy or on the surface of a component of the toy. The composition can be incorporated partially or fully throughout the toy or both. In one embodiment, the composition is orally accessible by the intended user. The present invention encompasses partially consumable toys, e.g., toys comprising plastic components, and fully consumable toys, e.g., various artificial bones and similar foods. Further, the invention encompasses toys for both human and non-human use, particularly toys for companion, farm, and zoo animal use, and more particularly for feline and canine use.

Under one embodiment, the companion animal is a canine or a dog. The dietary composition of the present invention is particularly suitable for treating senior dogs. The dietary composition of the present invention is also particularly suitable for treating small and miniature dogs.

Under one embodiment, the present invention is also directed to a method of improving immune response in a companion animal comprising administering to the companion animal a pet food comprising an effective amount of the dietary composition. Under one embodiment, the dietary composition is a nutritionally complete dog food.

This method improves the immune response in companion animals by administering food, which comprises added betaine and carnitine. The use of elevated amounts of betaine and carnitine has been shown to reduce basal inflammation, yet enhances acute inflammation. Reduction of basal inflammation is a desirable effect in animals with inflammation. Enhancement of acute inflammation is also a desirable effect in companion animals that are fighting an infection.

This immune response improvement is achieved by feeding the animal with a dietary composition comprising effective elevated amounts of betaine and carnitine.

As used herein, the phrases such as "an amount effective", "an effective amount", and like terms refer to that amount of a ingredients, material or compositions as described herein that may be effective to achieve a particular biological result. Examples of such results include the improvement of the immune system response, the reduction of basal inflammation, an enhancement of acute inflammation, a combination thereof, and like. Such effective activity may be achieved, for example, by administration of any of the dietary composition or pet food of the present invention to an animal. The effective amount may be based on several factors, including an animal's weight, the metabolizable energy of the composition, and frequency of feeding the animal compositions of the present invention, such as once, twice, or three times daily, and the presence or identity of other compositions fed to the animal.

The effectiveness of the treatment may be ascertained by maximizing the benefit to immune function involving decreasing chronic inflammation (unstimulated cells), as well as increasing the response to infection (stimulated cells), as evaluated using the TruCulture technology. This technology allows for the basal cytokine release to be measured and the stimulated cytokine release after stimulation with the bacterial component LPS. This technology removes circulating immune cells and maintains them in short term primary culture where they produce cytokines. The cytokines TNF-alpha, IL-6, IL-7, IL-8, MCP-1, IL-10, and IL-15 were measured. To measure the response, any of these 7 cytokines may be used. Alternatively, any two cytokines may be measured and added in a linear fashion. Alternatively, any three cytokines may be measured and added in a linear fashion. Alternatively, any four cytokines may be measured and added in a linear fashion. Alternatively, any five cytokines may be measured and added in a linear fashion. Alternatively, any six cytokines may be measured and added in a linear fashion. Alternatively, all seven cytokines may be measured and added in a linear fashion.

TNF-alpha, tumor necrosis factor, is a cell signaling protein involved in systemic inflammation and is one of the cytokines that make up the acute phase reaction. IL-6, or Interleukin 6, is an interleukin that acts as both a pro-inflammatory cytokine and an anti-inflammatory myokine. IL-7, or Interleukin 7, is a hematopoietic growth factor secreted by stromal cells in the bone marrow and thymus. IL-8, or Interleukin 8, CXCL8, is a chemokine produced by macrophages and other cell types such as epithelial cells, airway smooth muscle cells and endothelial cells. IL-10, or Interleukin 10, also known as a cytokine synthesis inhibitory factor (CSIF), is an anti-inflammatory cytokine. IL-15, or Interleukin-15, is a cytokine that binds to and signals through a complex composed of IL-2/IL-15 receptor beta chain (CD122) and the common gamma chain (gamma-C, CD132). This cytokine induces cell proliferation of natural killer cells; cells of the innate immune system whose principal role is to kill virally infected cells.

The treatment of the diet with both added carnitine and betaine has been shown below to maximize this immune response. This response by the use of a combination of betaine and carnitine is greater than the response of that of a diet without either a betaine or carnitine. Further, this response by the use of a combination of betaine and carnitine is greater than the response of that of betaine only. Yet further, this response by the use of a combination of betaine and carnitine is greater than the response of that of carnitine only. Still further, this response by the use of a combination of betaine and carnitine is greater than would be predicted as the sum of the uses of betaine only and carnitine only.

There appears to be a yet unexplained synergistic effect of the use of betaine and carnitine in dog's diet than would be predicted from the data on betaine alone and carnitine alone.

Examples

A full factorial, two-factor, two-level, experiment was designed and carried out as shown in Table 1.

TABLE 1

Composition of additives

| | Betaine added (ppm) | Carnitine added (ppm) | Sample size |
|---|---|---|---|
| Diet A | 0 | 0 | 8 |
| Diet B | 5000 | 0 | 8 |
| Diet C | 0 | 300 | 8 |
| Diet D | 5000 | 300 | 8 |

A base diet was formulated according to the AAFCO nutrition recommendation. The base diet contained about 300 ppm of betaine, and 23 ppm of carnitine. The base diet was designated as Diet A. Diets B, C and D were prepared as in Table 1.

The study was performed on a total of 32 healthy dogs with an age range from about 2.0 years to about 12.0 years, and body weight range from about 8.0 kg to about 14.0 kg. All animals were either neutered or spayed. All 32 dogs were pre-fed with Diet A (the base diet) for 14 days. The 32 dogs were divided into four groups of 8 dogs each by matching age and gender parameters. Each group was fed one of the four diets for 90 days without a washout period.

Initial and end of study samples were measured for immune response by the use of TruCulture technology. This technology allowed for the basal cytokine release to be measured and the stimulated cytokine release after stimulation with the bacterial lipopolysaccharides (LPS). Circulating immune cells were removed and were maintains in short term primary culture where immune cells produced cytokines. The cytokines TNF-alpha, IL-6, IL-7, IL-8, MCP-1, IL-10, and IL-15 were measured. The molar concentration of the sum of all the cytokines was observed as the overall response variable.

The results of the analysis are presented in Table 2 (below).

TABLE 2

| Percent change in cytokine production after feeding | | | | |
|---|---|---|---|---|
| | Diet A | Diet B | Diet C | Diet D |
| Unstimulated (%) | 1.1 | −13.2 | 10.3 | −17.8 |
| LPS (%) | −5.6 | 12.5 | 5.8 | 22.5 |

The values −17.8 and 22.5 are statistically different ($p<0.01$). There was an overall f-test significance of the interaction of LPS, betaine, carnitine and phase (initial as compared to post treatment) with $p<0.01$.

The data shows that there is an interaction of dietary betaine, carnitine and cellular LPS stimulation on production of cytokines. The observed response shows that for those dogs receiving both betaine and carnitine there was a reduction in cytokine production in the unstimulated cells (basal inflammation is done) and an increase in the stimulated production (bacterial response is enhanced) as compared to the control (no betaine, no carnitine) fed dogs.

When betaine and carnitine are combined there is a reduction in basal inflammation and an enhanced response to bacterial stimulation when compared to those pets before feeding.

Only the combined betaine and carnitine treatment group (Diet D) had a statistically significant different response in cytokine production when the change in the unstimulated production (expressed as a percent of the initial production) was compared to the LPS stimulated production (expressed as a percent of the initial production).

Resting cytokine production, which acts as a proxy for chronic inflammation, was investigated. A range of the betaine and carnitine intake with regards to enhanced immune response was studied. One method of showing the effectiveness is to note that there is a varied effect on the unstimulated cells (which is basal inflammation rate) and the stimulated cells (the response to a bacterial insult). The change in the natural log of the total moles of the unstimulated cells is shown in Table 3 (below).

TABLE 3

| Diet | Mass ratio LSMEAN | Standard Error | Pr > Itl | LSMEAN Number |
|---|---|---|---|---|
| Diet A | 0.00303 | 0.12780 | 0.9812 | 1 |
| Diet B | −0.14882 | 0.12780 | 0.2541 | 3 |
| Diet C | 0.04214 | 0.12780 | 0.7441 | 2 |
| Diet D | −0.30794 | 0.12780 | 0.0228 | 4 |

The difference of the natural log of the initial concentration subtracted from the log of the final concentration for a given treatment is given by the following equation:

$$\text{Effect on unstimulated cells} = \ln(\text{UNSTIM}_{final}) - \ln(\text{UNSTIM}_{initial}).$$

This equation can be re-written as:

$$\text{Effect on unstimulated cells} = \ln(\text{UNSTIM}_{final}/\text{UNSTIM}_{initial}).$$

The data shows that the only diet that had a significant change from zero was Diet D, (i.e., the group of dogs that consumed both added betaine and added carnitine):

$$e\hat{}(-0.30794) = 73.5\%.$$

The effect of the diet on acute infection was also investigated. The change in the immune response of the cells that were stimulated by lipopolysaccharide was studied. This is a measure of the cells' ability to respond to an antigen representing an attack by bacteria. The results are disclosed in Table 4 (below).

TABLE 4

| Diet | Mass ratio LSMEAN | Standard Error | Pr > Itl | LSMEAN Number |
|---|---|---|---|---|
| Diet A | −0.06948 | 0.09272 | 0.4599 | 1 |
| Diet B | 0.09171 | 0.09272 | 0.3311 | 3 |
| Diet C | 0.04134 | 0.09272 | 0.6591 | 2 |
| Diet D | 0.12925 | 0.09272 | 0.1743 | 4 |

Similarly, as for unstimulated cells, the response to dietary treatment for stimulated cells is calculated as the difference of final minus initial cytokine levels as shown in the following equations:

Effect on stimulated cells $= \ln(\text{STIM}_{final}) - \ln(\text{STIM}_{initial})$, which can be re-written as:

$$\text{Effect on stimulated cells} = \ln(\text{STIM}_{final}/\text{STIM}_{initial}).$$

Increasing the benefit to immune function involves decreasing chronic inflammation (unstimulated cells) as well as increasing robustness of response to infection (stimulated cells). To ascertain the treatment which optimizes the benefit of reducing the unstimulated cytokine production while concurrently increasing the stimulated cytokine production, the response to treatment in the unstimulated cells is subtracted from the response to treatment in the stimulated cells. This is a difference of differences, termed as a "shift," in immune response toward a maximized benefit and the shift may be calculated according to the following equation:

Max benefit $= [\ln(\text{STIM}_{final}) - \ln(\text{STIM}_{initial})] - [\ln(\text{UNSTIM}_{final}) - \ln(\text{UNSTIM}_{initial})]$, which may be re-written as:

$$\text{Max benefit} = \ln[(\text{STIM}_{final} \times \text{UNSTIM}_{initial})/(\text{STIM}_{initial} \times \text{UNSTIM}_{final})].$$

This shift is the ratio of the response of stimulated cells to the response of unstimulated cells.

An analysis of the empirical data using the above model yields results as shown in Table 5 (below).

TABLE 5

| Diet | "Shift" LSMEAN | Standard Error | Pr > Itl | LSMEAN Number |
|---|---|---|---|---|
| Diet A | −0.07252 | 0.14470 | 0.6202 | 1 |
| Diet B | 0.24054 | 0.14470 | 0.1076 | 3 |
| Diet C | −0.00079 | 0.14470 | 0.9957 | 2 |
| Diet D | 0.43720 | 0.14470 | 0.0053 | 4 |

The Shift LSMEAN is greatest for Diet D, which indicates a 55% increase (i.e., $e\hat{}(0.43720)=1.5483$ fold) in the response, as compared to Diet A which in turn had a −7.0% decrease (i.e., $e\hat{}(-0.07252)=0.9300$ fold) in the response, of the stimulated cells as compared to the unstimulated cells.

The treatment of the diet with both added carnitine and betaine maximized this response. This response by the use of Diet D is greater than the response of that of a diet without either a betaine or carnitine (Diet A). Further, this response by the use of Diet D is greater than the response of that of betaine only (Diet B). Yet further, this response by the use of Diet D is greater than the response of that of carnitine only (Diet C). Still further, this response by the use of Diet D is greater than would be predicted as the sum of the two treatments.

The data described hereinabove illustrates a synergistic effect provided by the combination of betaine and carnitine, which was unexpected in view of the data generated by betaine alone and carnitine alone.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A method for treating an infection in a canine in need thereof, comprising administering to the canine a pet food composition comprising:

from about 700 ppm to about 10,000 ppm of betaine by mass; and from about 50 ppm to about 700 ppm of carnitine by mass, wherein the mass ratio of betaine to carnitine is between about 25:1 to about 8:1, wherein the canine has an inflammatory disease, disorder or condition selected from arthritis or joint pain and is fighting an infection, and wherein the method enhances acute inflammation in the canine.

2. The method according to claim 1, wherein the inflammatory disease, disorder or condition is arthritis.

3. The method according to claim 1, wherein the pet food composition further comprises an additional ingredient selected from: a mineral; a vitamin; a carbohydrate source; a fat; a protein; a fiber source; an amino acid; a carotenoid; an antioxidant; a fatty acid; a glucose mimetic; a probiotic; a prebiotic; or a combination thereof.

4. The method according to claim 1, wherein the pet food composition comprises from about 1,500 ppm to about 7,000 ppm of betaine by mass.

5. The method according to claim 1, wherein the pet food composition comprises from about 100 ppm to about 700 ppm of carnitine by mass.

6. The method according to claim 1, wherein the mass ratio of betaine to carnitine is between about 18:1 to about 12:1.

7. The method according to claim 1, wherein the mass ratio of betaine to carnitine is between about 25:1 to about 18:1.

8. The method according to claim 1, wherein the pet food composition is a wet pet food.

9. The method according to claim 1, wherein the pet food composition is a dry pet food.

10. The method according to claim 1, wherein the pet food composition further comprises an anti-inflammatory adjuvant.

11. The method according to claim 10, wherein the anti-inflammatory adjuvant is selected from: curcumin; tetrahydrocurcumin; clove; ginger; rosemary; paprika; a berry; or a combination thereof.

12. The method according to claim 1, wherein the betaine and the carnitine are present in an amount effective to reduce circulating lipopolysaccharide.

13. The method according to claim 1, wherein the betaine and the carnitine are present in an amount effective to decrease inflammation.

14. The method according to claim 1, wherein the betaine and the carnitine are present in an amount effective to increase an anti-inflammatory cytokine.

15. The method according to claim 14, wherein the anti-inflammatory cytokine is selected from: interleukin-1 receptor antagonist (IL-1ra); interleukin-4 (IL-4); interleukin-6 (IL-6); interleukin-10 (IL-10); interleukin-11 (IL-11); interleukin-13 (IL-13); transforming growth factor-beta (TGF-β); or a combination thereof.

* * * * *